US010712235B2

(12) United States Patent
Pattom et al.

(10) Patent No.: US 10,712,235 B2
(45) Date of Patent: Jul. 14, 2020

(54) SYSTEM AND METHOD FOR MONITORING OPERATING CONDITION IN A HYDRAULIC TURBOCHARGER

(71) Applicant: Energy Recovery, Inc., San Leandro, CA (US)

(72) Inventors: Matthew Joseph Pattom, Fremont, CA (US); Chinmay Vishwas Deshpande, Fremont, CA (US); Jeremy Grant Martin, Oakland, CA (US)

(73) Assignee: ENERGY RECOVERY, INC., San Leandro, CA (US)

( * ) Notice: Subject to any disclaimer, the term of this patent is extended or adjusted under 35 U.S.C. 154(b) by 237 days.

(21) Appl. No.: 15/956,961

(22) Filed: Apr. 19, 2018

(65) Prior Publication Data

US 2018/0306672 A1    Oct. 25, 2018

Related U.S. Application Data

(60) Provisional application No. 62/489,176, filed on Apr. 24, 2017.

(51) Int. Cl.
*G01M 13/04*    (2019.01)
*F04D 13/04*    (2006.01)
(Continued)

(52) U.S. Cl.
CPC .......... *G01M 13/04* (2013.01); *F01D 21/003* (2013.01); *F04D 13/04* (2013.01); *F04D 13/043* (2013.01); *F04D 15/0088* (2013.01); *F04D 29/0473* (2013.01); *F16C 17/246* (2013.01); *G01H 1/006* (2013.01); *G01M 13/045* (2013.01);
(Continued)

(58) Field of Classification Search
CPC ... G01M 13/04; G01M 13/045; F04D 13/043; F04D 29/0473; F04D 13/04; F04D 15/0088; G01H 1/006; F16C 17/246; F16C 2233/00; F16C 2360/24; F16C 17/10; F01D 21/003; F05D 2260/80; F05D 2220/40; F05D 2240/50
See application file for complete search history.

(56) References Cited

U.S. PATENT DOCUMENTS 4,643,592 A  *  2/1987  Lewis ................... F16C 17/03
                                                         384/100
7,406,830 B2     8/2008  Valentian et al.
(Continued)

FOREIGN PATENT DOCUMENTS

EP    1672270 A2    6/2006
FR    3030625 A1    6/2016
(Continued)

OTHER PUBLICATIONS

PCT/US2018/028896; International Search Report Written Opinion; dated Jul. 26, 2018, 6 pages.

*Primary Examiner* — Daniel S Larkin
*Assistant Examiner* — Anthony W Megna Fuentes
(74) *Attorney, Agent, or Firm* — Fletcher Yoder, P.C.

(57) ABSTRACT

A system includes a monitoring system to monitor an operational parameter of a bearing assembly within a hydraulic turbocharger. The bearing monitoring system includes at least one sensor to monitor a relative position or operational parameter of one or more rotating components of the bearing assembly.

14 Claims, 6 Drawing Sheets

(51) Int. Cl.
*G01H 1/00* (2006.01)
*F04D 29/047* (2006.01)
*F16C 17/24* (2006.01)
*G01M 13/045* (2019.01)
*F01D 21/00* (2006.01)
*F04D 15/00* (2006.01)
*F16C 17/10* (2006.01)

(52) U.S. Cl.
CPC ...... *F05D 2220/40* (2013.01); *F05D 2240/50* (2013.01); *F05D 2260/80* (2013.01); *F16C 17/10* (2013.01); *F16C 2233/00* (2013.01); *F16C 2360/24* (2013.01)

(56) References Cited

U.S. PATENT DOCUMENTS

| | | | | |
|---|---|---|---|---|
| 7,631,498 | B2 * | 12/2009 | Greentree | F01D 21/003 324/174 |
| 2010/0292937 | A1 * | 11/2010 | Hosny | F02C 6/12 702/34 |
| 2012/0180482 | A1 * | 7/2012 | Kapich | F02B 37/10 60/608 |
| 2013/0017062 | A1 | 1/2013 | Kochetov | |
| 2014/0366632 | A1 * | 12/2014 | Lerchenmueller | F01D 17/06 73/509 |
| 2015/0070004 | A1 * | 3/2015 | Lerchenmueller | F02C 6/12 324/207.25 |
| 2016/0138649 | A1 | 5/2016 | Anderson et al. | |
| 2016/0160917 | A1 | 6/2016 | Deshpande | |

FOREIGN PATENT DOCUMENTS

| | | |
|---|---|---|
| WO | 0114835 A1 | 3/2001 |
| WO | 2008015777 A1 | 2/2008 |
| WO | 2016090198 A1 | 6/2016 |

* cited by examiner

SYSTEM AND METHOD FOR MONITORING OPERATING CONDITION IN A HYDRAULIC TURBOCHARGER

CROSS-REFERENCE TO RELATED APPLICATION

This application claims priority to and the benefit of U.S. Application No. 62/489,176, entitled "System and Method for Monitoring Operating Condition in a Hydraulic Turbocharger", filed Apr. 24, 2017, which is herein incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The subject matter disclosed herein relates to a hydraulic turbocharger, and, more particularly, to systems and methods for monitoring bearing condition in the hydraulic turbocharger.

Typically, pumps and turbines include a mechanical seal or equivalent structure that keeps the bearings (e.g., axial and/or radial bearings) from being exposed to process fluids. In hydraulic turbochargers, these mechanical seals are not present and the process fluid or product lubricates the bearings. However, accurate measurements of bearing conditions may be difficult in hydraulic turbochargers.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed in detail below, systems and methods are provided for monitoring bearing conditions in a hydraulic turbocharger (e.g., liquid-phase turbocharger). In certain embodiments, one or more probes or sensors of a bearing monitoring system may be exposed to a process fluid that lubricates a bearing system (e.g., axial and/or radial bearings) of the hydraulic turbocharger. The bearing monitoring system, based on the feedback from the sensors, may determine an operational parameter of the bearing assembly such as a bearing condition (e.g., due to wear), thrust direction, rotating assembly stability, speed of the rotating assembly, temperature, pressure, and/or a hydraulic operating point. In addition, the bearing monitoring system may provide an alarm or notification if the operational parameter deviates from an acceptable or desired level.

Figure 1:
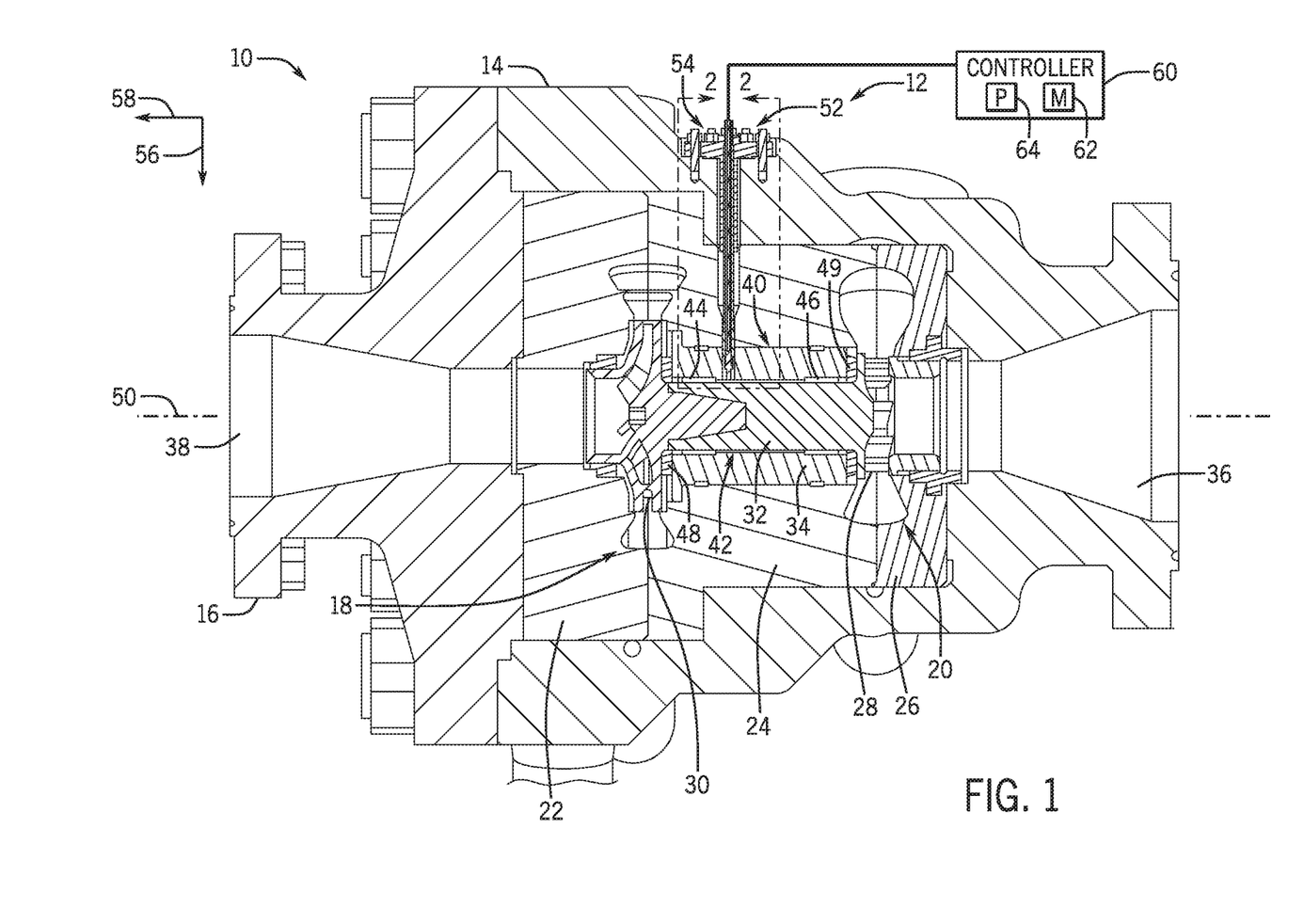
FIG. 1 is a cross-sectional diagram of an embodiment of a hydraulic turbocharger coupled to a bearing monitoring system.

FIG. 1 is a cross-sectional diagram of an embodiment of a hydraulic turbocharger 10 (e.g., liquid-phase turbocharger) coupled to a bearing monitoring system 12. The hydraulic turbocharger 10 may be utilized in oil and gas applications (e.g., on-shore and/or off-shore), gas processing (e.g., during acid gas removal), ammonia production (e.g., during $CO_2$ removal), desalination applications, and other applications. The structure of the hydraulic turbocharger 10 may vary from the depicted structure. As depicted, the hydraulic turbocharger 10 includes an outer housing or casing 14 coupled to an end cover 16 that house a pump 18 (e.g., pump section) and a turbine 20 (e.g., turbine section). The pump 18 is formed by volute sections 22, 24 and the turbine 20 formed by volute sections 24, 26. The hydraulic turbocharger 10 includes a turbine impeller 28 (as part of the turbine 20) coupled to a pump impeller 30 (as part of the pump 18) via a rotatable shaft 32 disposed within a sleeve 34. The hydraulic turbocharger 10 includes a turbine inlet (not shown), a turbine outlet 36, a pump inlet 38 (e.g., formed within the end cover 16), and a pump outlet (not shown).

The hydraulic turbocharger 10 includes a bearing assembly 40. The bearing assembly 40 includes a radial bearing 42 (e.g., journal bearing) to support the shaft 32. The radial bearing 42 includes annular bushings 44, 46 (e.g., journal bearing bushings) disposed about opposite ends of the shaft 32 between the sleeve 34 and shaft 32. The bearing assembly 40 also includes an annular thrust bearing 48 (e.g., configured to handle axial loads) disposed about the shaft 32 between the pump impeller 30 and the sleeve 34 and an annular thrust bearing 49 disposed about the shaft between the turbine impeller and the sleeve 34. Since mechanical seals are absent, the bearings 42, 48, 49 are lubricated via the process fluid.

In operation, a first fluid at high pressure enters the turbine 20 via the turbine inlet and a second fluid at low pressure (e.g., relative to the pump outlet) enters the pump 18 via the pump inlet 38. As the first fluid enters the hydraulic turbocharger 10, the first fluid contacts the turbine impeller 28 transferring energy from the first fluid to the turbine impeller 28, which drives rotation of the turbine impeller 28 about an axis 50. The shaft 32 transfers the rotational energy from the turbine impeller 28 to the pump impeller 30. After transferring energy to the turbine impeller 28, the first fluid exits the hydraulic turbocharger 10 as a lower-pressure fluid trough the turbine outlet 36. The rotation of the pump impeller 30 increases the pressure of the second fluid entering the hydraulic turbocharger 10 via the pump inlet 38. Once pressurized, the second fluid exits the hydraulic turbocharger 10 as a higher-pressure fluid via the pump outlet.

The bearing monitoring system 12 includes one or more sensor or probe assemblies 52 (e.g., proximity sensors) for monitoring one or more parameters (e.g., changes in position of the shaft 32, speed of rotational assembly, temperature, pressure, etc.) related to the bearing assembly 40. The sensor assemblies 52 extend into the hydraulic turbocharger 10 to be exposed to the process fluid to enable accurate measurements. The sensor assemblies 52 may include one or more sensor assemblies 52 (e.g., sensor assembly 54) extending radially 56 (e.g., relative to axis 50) into the hydraulic turbocharger 10 to measure changes in the position of the shaft 32 in the radial direction 56. The sensor assemblies 52 may include a plurality of sensor assemblies 52 (e.g., two or more) to measure radial shaft position circumferentially disposed at a same axial location (e.g., relative to the axis 50) 90 degrees apart (see FIG. 3). The sensor assemblies 52 may also include one or more sensor assemblies 52 extending at an oblique angle (e.g., relative to the axis 50) through the end cover 16 to be directed at a surface of the pump impeller 30 to measure changes in the position of the shaft 32 in an axial direction 58 (see FIG. 4). The sensor assemblies 52 may include a plurality of sensor assemblies 52 (e.g., two sensor assemblies) to measure axial shaft position disposed at a same axial location (e.g., relative to the axis 50) 180 degrees out of phase from each other (see FIG. 4). The sensor assemblies 52 may further include a sensor assembly 52 (e.g., key phasor probe) extending radially 56 (e.g., relative to axis 50) into the hydraulic turbocharger 10 to measure a rotational speed of the shaft 32.

The bearing monitoring system 12 also includes a controller 60 communicatively coupled to the sensor assemblies 52. The controller 60 receives signals from the sensor assemblies 52 and determines parameters related to the bearing assembly 40 based on the signals. These parameters may include bearing condition (i.e., wear as determined by position changes in the shaft 32), thrust direction, rotating assembly stability (e.g., based on radial and/or axial vibration amplitude), speed (e.g., RPM) of the rotation assembly, and/or a hydraulic operating point (e.g., maximum operating efficiency point for the hydraulic turbocharger 10) taking into account the thrust and/or radial load direction. In certain embodiments, the sensor assemblies 52 may include temperature and/or pressure sensors to measure a temperature and pressure, respectively. In certain embodiments, the controller 60 compares one or more parameters to a respective threshold or range. If the parameter is not acceptable (e.g., exceeds a threshold, falls below a threshold, falls outside a range, etc.), an alarm or notification may be provided to the operator.

The controller 60 includes a memory 62 (e.g., a non-transitory computer-readable medium/memory circuitry) communicatively coupled to a processor 44. Each memory 62 stores one or more sets of instructions (e.g., processor-executable instructions) implemented to perform operations related to the bearing monitoring system 12. More specifically, the memory 62 may include volatile memory, such as random access memory (RAM), and/or non-volatile memory, such as read-only memory (ROM), optical drives, hard disc drives, or solid-state drives. Additionally, the processor 64 may include one or more application specific integrated circuits (ASICs), one or more field programmable gate arrays (FPGAs), one or more general-purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits.

Figure 2:
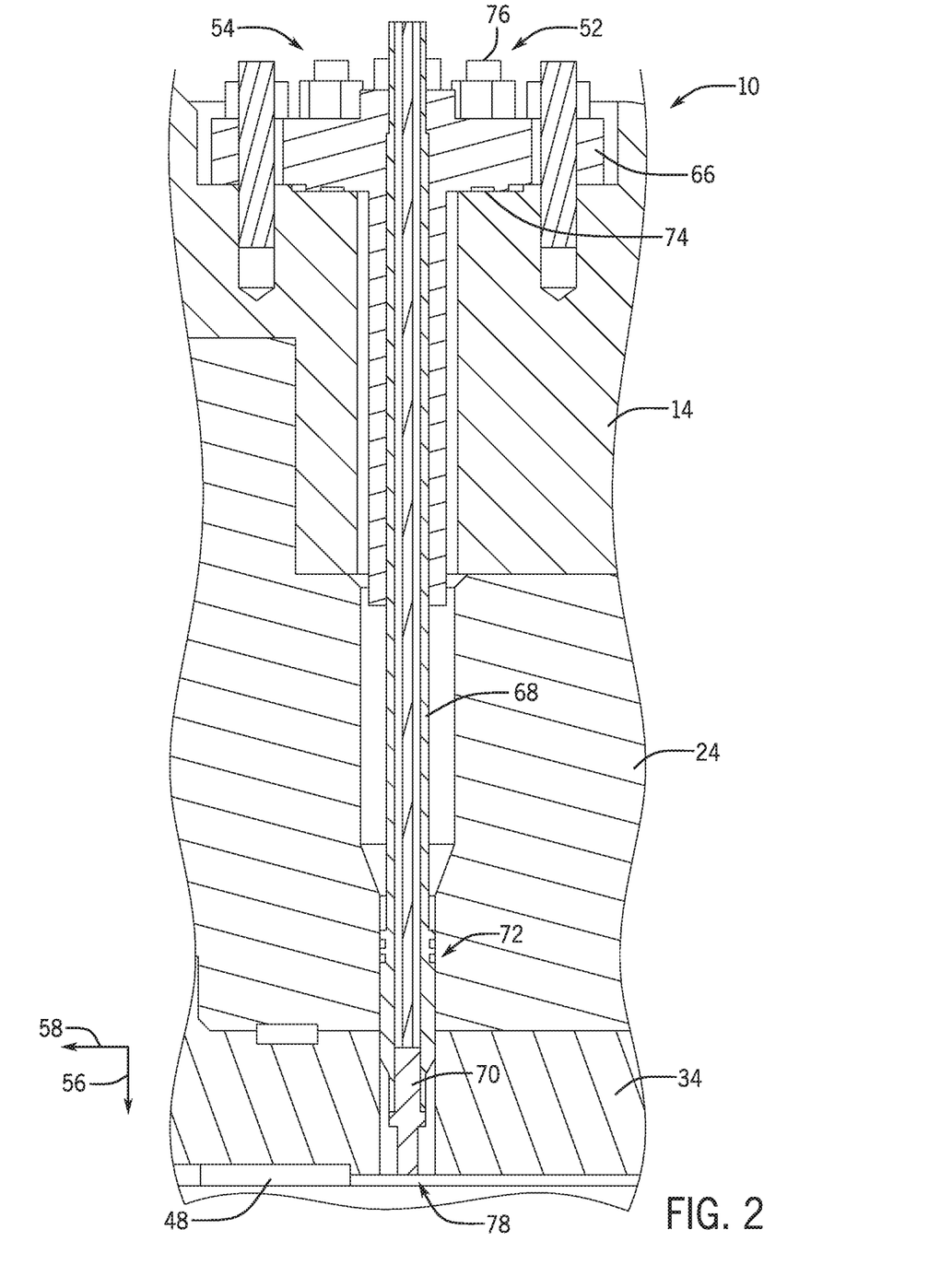
FIG. 2 is a cross-sectional diagram of a sensor assembly taken within line 2-2 of FIG. 1.

FIG. 2 is a cross-sectional diagram of the sensor assembly 54 taken within line 2-2 of FIG. 1. As depicted, the sensor assembly 54 is reverse mounted on the hydraulic turbocharger 10. The sensor assembly 54 includes an extended flange 66, a probe sleeve 68, a probe or sensor 70, O-rings 72, a gasket 74, and fasteners 76 (e.g., nuts and bolts). The extended flange 66 of the sensor assembly 54 is coupled to the hydraulic turbocharger 10 via the fastener 76. The sensor assembly 54 extends radially 56 through the outer housing 14, the volute section 24, and the sleeve 34 so that the probe 70 is exposed to the process fluid in gap 78 (e.g., between the sleeve 34 and the shaft 32). As positioned, the sensor assembly 54 measures changes in the position of the shaft 32 in the radial direction 56. In certain embodiments, sensor assemblies 52 similar to the sensor assembly 54 may extend through the end cover 16 and other components of the hydraulic turbocharger 10 at an oblique angle to measure changes in the position of the shaft 32 in the axial direction 58. In certain embodiments, in order to differentiate between radial and axial movement (e.g., of the shaft 32) using the angled sensor assemblies, at least four sensor assemblies may be utilized (e.g., a couple of sensor assemblies extending radially into the hydraulic turbocharger and a couple of sensor assemblies extending both axially and radially into the hydraulic turbocharger or any other combination of different sensor assemblies). In addition, it should be noted that the sensor assemblies may come in at any angle with respect to the longitudinal axis 50 of the hydraulic turbocharger or rotational axis of the shaft 32 and may measure radial, axial, or both radial and axial movement of the shaft 32.

Figure 3:
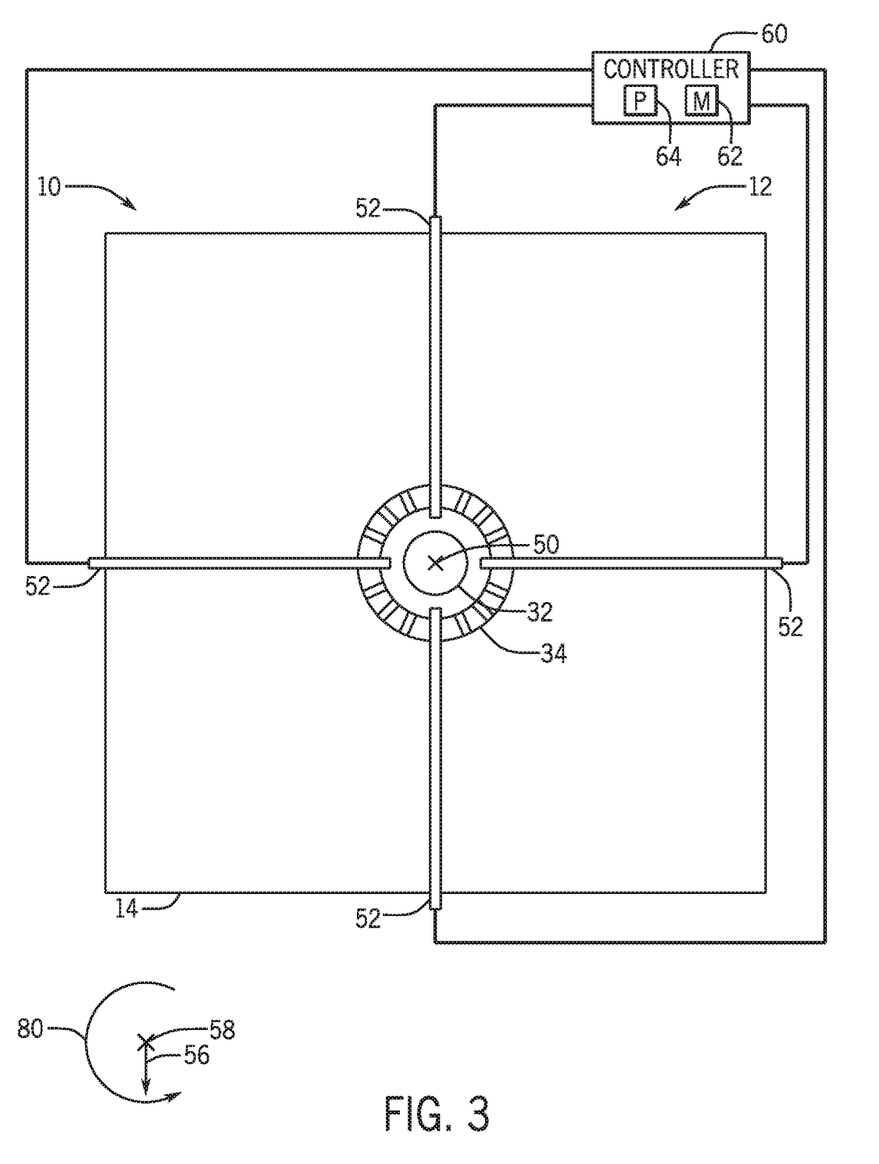
FIG. 3 is a cross-sectional schematic diagram of a hydraulic turbocharger coupled to a bearing monitoring system.

FIG. 3 is a cross-sectional schematic diagram of the hydraulic turbocharger 10 coupled to the bearing monitoring system 12. For simplicity, the exact shape and each component of the hydraulic turbocharger 10 are not depicted. FIG. 3 depicts a plurality of the sensor assemblies 52 (similar to the sensor assembly 54 in FIG. 2) circumferentially 80 disposed about a single axial location (e.g., relative to axis 50) along the hydraulic turbocharger 10. Although four sensors assemblies 52 are shown, the bearing monitoring system 12 may include as few as two sensor assemblies 52. As depicted, the sensor assemblies are circumferentially 80 disposed 90 degrees apart from each other. Each of the sensor assemblies 52 measures changes in the position of the shaft 32 in the radial direction 56.

Figure 4:
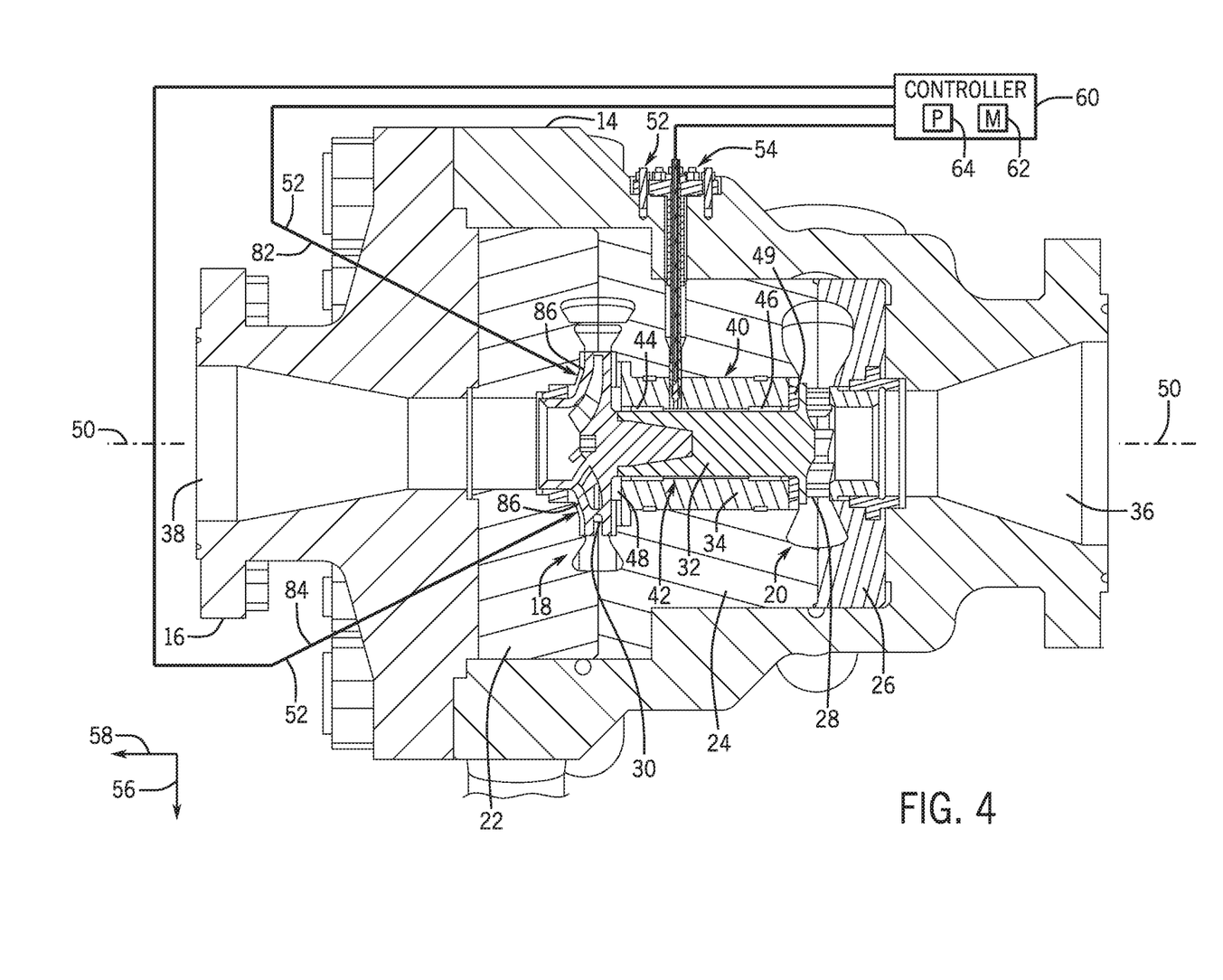
FIG. 4 is a cross-sectional diagram of an embodiment of a hydraulic turbocharger coupled to a bearing monitoring system (e.g., having radial and axial probes)

FIG. 4 is a cross-sectional diagram of an embodiment of the hydraulic turbocharger 10 coupled to the bearing monitoring system 12 (e.g., having radial and axial probes). The bearing monitoring system 12 includes sensor assemblies 54 as described in FIGS. 2 and 3 to measure changes in the position of the shaft 32 in the radial direction 56. In addition, the bearing monitoring system 12 includes sensor assemblies 52 (e.g., sensor assemblies represented by arrows 82, 84) that measure changes in the position of the shaft 32 in the axial direction 58. In certain embodiments, the sensor assemblies 52 may include temperature and/or pressure sensors to measure a temperature and pressure, respectively. Structurally, the sensor assemblies 82, 84 may be similar to sensor assembly 54 in FIG. 2. As depicted, the sensor assemblies 82, 84 extend radially 56 and axially 58 at an oblique angle (e.g., relative to the axis 50) through the end cover 16 and volute section 18 to be directed at a surface 86 of the pump impeller 30 to measure changes in the position of the shaft 32 in the axial direction 58. The sensor assemblies 82, 84 are disposed (e.g., circumferentially relative about the axis 50) 180 degrees out of phase from each other (e.g., relative to the axis 50). Disposing the sensors assemblies 82, 84 at the oblique angles keeps the suction and discharge flanges associated with the pump impeller 30 from hindering measuring the axial changes in the position of the shaft 32.

Figure 5:
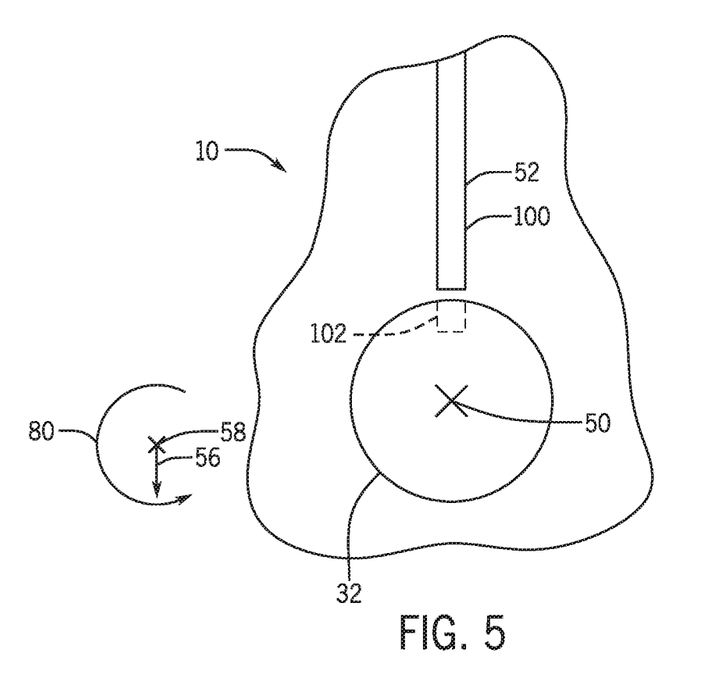
FIG. 5 is a schematic diagram of a sensor assembly disposed an angle relative to a surface of a pump impeller of a hydraulic turbocharger.

Since the sensor assemblies 82, 84 are disposed at the oblique angles, trigonometry may be utilized to determine the axial shaft position as depicted in FIG. 5. FIG. 5 depicts the sensor assembly 82 disposed at an oblique angle relative to the surface 86 of the pump impeller 30. FIG. 5 depicts axial displacement 88 of the surface 86 of the pump impeller 30 (whose axial displacement is equivalent to the axial displacement of the shaft 32) from a first position 90 to a second position 92. An angle 94, θ, of an axis 96 of the sensor assembly 82 relative to the axis 50 is known. Based on the angle 94 and a distance 94, h, that the surface 86 of the pump impeller 30 is displaced from the first position to the second position 92 along the axis 96, a distance for axial displacement 88, t, may be determined utilizing the following equation:

$$h \cos \theta = t \quad (1).$$

Figure 6:
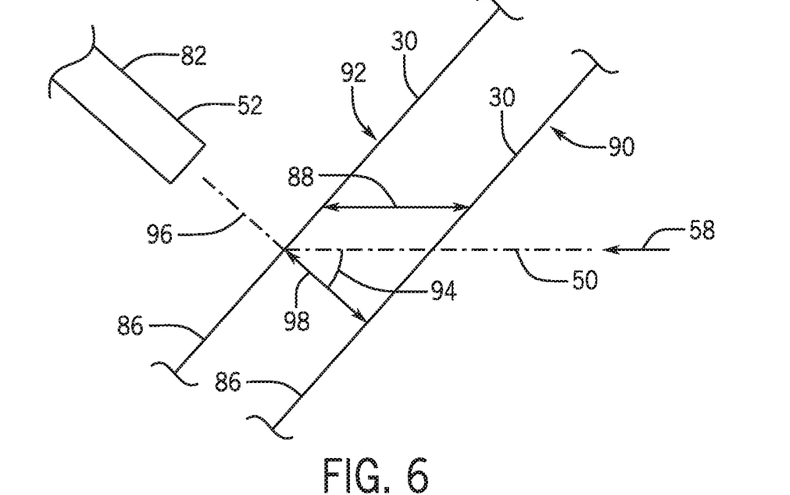
FIG. 6 is a schematic diagram of an embodiment of a portion of a hydraulic turbocharger coupled to key phasor.

FIG. 6 is a schematic diagram of an embodiment of a portion of the hydraulic turbocharger 10 coupled to a key phasor 100. As mentioned above, the sensor assemblies 52 may include a key phasor 100 to determine a rotation speed (e.g., RPM) of the shaft 32 (as well as a speed of the rotating assembly including the turbine impeller 28, pump impeller 30, etc.). The key phasor 100 may extend radially 56 into the hydraulic turbocharger similar to the sensor assembly 54 in FIG. 2. In certain embodiments, the shaft 32 may include a shaft reference or keyway 102 (e.g., recess or notch). Since the key phasor 100 is a gap to voltage transducer, each time the shaft reference 102 passes the probe of the key phasor 100, a voltage pulse is generated which can be utilized to determine the speed of the shaft 32. In an alternate embodiment, the key phasor 100 may be disposed at an oblique angle enabling the key phasor to interface at the shrouds of the impeller or turbine. The shroud (e.g., of the impeller or turbine) may include a recess or notch which may be utilized to determine the speed of the shaft.

Figure 7:
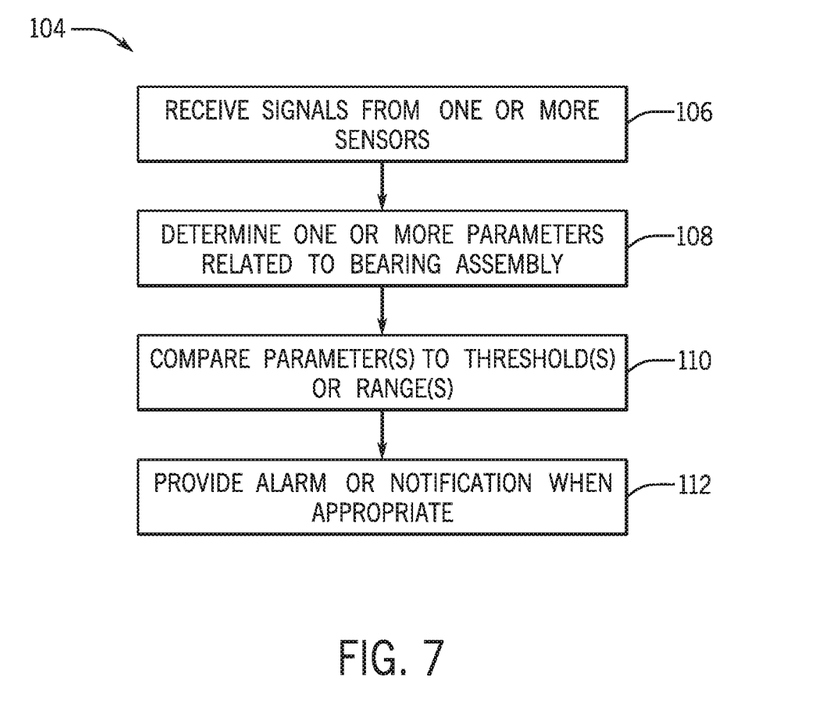
FIG. 7 is a flow diagram of an embodiment of a method for monitoring a bearing condition in a hydraulic turbocharger.

FIG. 7 is a flow diagram of an embodiment of a method 104 for monitoring a bearing condition in the hydraulic turbocharger 10. Some or all of the steps of the method 104 may be performed by the controller 60 of the bearing monitoring system 12 described above. The method 104 includes receiving signals from or more sensor assemblies 52 (block 106). The sensor assemblies 52 may include sensor assemblies 54 to measure the radial position of the shaft 32, sensor assemblies 82, 84 to measure the axial position of the shaft 32, and/or the key phasor 100. In certain embodiments, the sensor assemblies 52 may include temperature and/or pressure sensors to measure a temperature and pressure, respectively. The method 104 also includes determining one or more operating parameters or conditions related to the bearing assembly 40 and the hydraulic turbocharger 10 from the received signals from the sensor assemblies 52 (block 108). The parameters may include a bearing condition (e.g., wear), which may be determined by position changes (e.g., axial and/or radial) in the shaft 32. The parameters may also include a thrust direction (e.g., axially 58 towards the pump inlet 38 or axially 58 towards the turbine outlet 36). The parameters may further include rotating assembly stability. The rotating assembly stability may be based on a vibration amplitude in the radial 56 or axial 58 direction. The parameters may still further include a speed of the rotating assembly (e.g., based on the signal from the key phasor 100). The parameters may yet further include a hydraulic operating point. The hydraulic operating point represents the current hydraulic operating conditions which can be inferred by considering axial or radial shaft position.

The method 104 further includes comparing parameter(s) to threshold(s) or range(s) (block 110). The threshold or range could be a distance, a vibration amplitude, speed (e.g., RPM), temperature, pressure, or other factor. The method 104 even further includes providing an alarm or notification when appropriate to an operator (e.g., when the parameter is abnormal and/or approaching abnormal) (block 112). For example, if a parameter falls outside a desired range (or a combination of parameters falls outside a respective range) the alarm or notification may be provided. Alternatively, if the parameter fails to meet (e.g., exceeds or falls below) a particular threshold (or a combination of parameters exceed and/or fall below a respective threshold).

While the disclosed subject matter may be susceptible to various modifications and alternative forms, specific embodiments have been shown by way of example in the drawings and have been described in detail herein. However, it should be understood that the disclosed subject matter is not intended to be limited to the particular forms disclosed. Rather, the disclosure is to cover all modifications, equivalents, and alternatives falling within the spirit and scope of the disclosure as defined by the following appended claims.

The invention claimed is:

1. A system, comprising: a hydraulic turbocharger configured to handle fluids and comprising a bearing assembly; and a monitoring system configured to monitor an operational parameter of the bearing assembly, wherein the operational parameter of the bearing assembly comprises a bearing condition, thrust direction, rotating assembly stability, speed of the rotating assembly, a position of a shaft of the hydraulic turbocharger, or a hydraulic operating point, wherein the monitoring system comprises one or more sensors extending into the hydraulic turbocharger to monitor the operational parameter of one or more rotating components of the bearing assembly, wherein at least one of the one or more sensors is configured to be exposed to a process fluid handled by the hydraulic turbocharger, and wherein the one or more sensors comprise a first sensor and a second sensor each extending axially and radially at an oblique angle into the hydraulic turbocharger relative to a longitudinal axis of the hydraulic turbocharger, both the first sensor and the second sensor being directed at a surface of a pump impeller of the hydraulic turbocharger, and both the first sensor and the second sensor are each configured to measure a change in the position of the shaft of the hydraulic turbocharger in an axial direction relative to the longitudinal axis.

2. The system of claim 1, wherein all of the one or more sensors extend into the hydraulic turbocharger and are configured to be exposed to the process fluid handled by the hydraulic turbocharger.

3. The system of claim 1, wherein the one or more sensors comprise a third sensor extending radially into the hydraulic turbocharger relative to the longitudinal axis of the hydraulic turbocharger, and the third sensor is configured to measure the change in the position of the shaft of the hydraulic turbocharger in a radial direction relative to the longitudinal axis.

4. The system of claim 3, wherein the one or more sensors comprise a fourth sensor extending radially into the hydraulic turbocharger relative to the longitudinal axis of the hydraulic turbocharger, and the fourth sensor is configured to measure the change in the position of the shaft in the radial direction relative to the longitudinal axis.

5. The system of claim 4, wherein the third and fourth sensors are circumferentially disposed about the hydraulic turbocharger relative to the longitudinal axis, the third and fourth sensors are disposed at a same axial location relative to the longitudinal axis, and the third and fourth sensors are circumferentially spaced 90 degrees apart.

6. The system of claim 1, wherein the first and second sensors are circumferentially disposed about the hydraulic turbocharger relative to the longitudinal axis, the first and second sensors are disposed at a same axial location relative to the longitudinal axis, and the first and second sensors are 180 degrees out of phase from each other.

7. The system of claim 1, wherein the one or more sensors comprise a key phasor probe extending radially into the hydraulic turbocharger relative to the longitudinal axis of the hydraulic turbocharger, and the key phasor probe is configured to measure a rotational speed of the shaft of the hydraulic turbocharger.

8. The system of claim 1, wherein the monitoring system comprises a controller configured to receive feedback from the one or more sensors and to monitor the operational parameter of the bearing assembly.

9. A system, comprising: a hydraulic turbocharger configured to handle fluids and comprising a bearing assembly; and a monitoring system configured to monitor one or more operational parameters of the bearing assembly, wherein the one or more operational parameters of the bearing assembly comprise a bearing condition, thrust direction, rotating assembly stability, speed of the rotating assembly, a position of a shaft of the hydraulic turbocharger, or a hydraulic operating point, and wherein the monitoring system comprises: a first sensor extending radially into the hydraulic turbocharger relative to a longitudinal axis of the hydraulic turbocharger, and the first sensor is configured to measure a change in a position of the shaft of the hydraulic turbocharger in a radial direction relative to the longitudinal axis; and a second sensor extending axially and radially at an oblique angle into the hydraulic turbocharger relative to the longitudinal axis, and the second sensor is configured to measure the change in the position of the shaft of the hydraulic turbocharger in an axial direction relative to the longitudinal axis, wherein the first sensor and the second sensor are configured to be exposed to a process fluid handled by the hydraulic turbocharger.

10. The system of claim 9, wherein the monitoring system comprises a controller configured to receive feedback from the first and second sensors and to monitor the one or more operational parameters of the bearing assembly.

11. The system of claim 10, wherein the monitoring system is configured to compare the one or more operational parameters to a respective threshold or range and to provide an indication when appropriate for the one or more operational parameters.

12. A method for monitoring a bearing assembly of a hydraulic turbocharger, comprising: monitoring the bearing assembly of the hydraulic turbocharger by: receiving one or more signals from one or more sensors extending into the hydraulic turbocharger, wherein the one or more sensors monitor an operational parameter of one or more rotating components of the bearing assembly, wherein the operational parameter of the bearing assembly comprises a bearing condition, thrust direction, rotating assembly stability, speed of the rotating assembly, a position of a shaft of the hydraulic turbocharger or a hydraulic operating point, and wherein the one or more sensors comprises a first sensor extending radially into the hydraulic turbocharger relative to a longitudinal axis of the hydraulic turbocharger, and the first sensor is configured to measure a change in a position of the shaft of the hydraulic turbocharger in a radial direction relative to the longitudinal axis, and the one or more sensors comprises a second sensor extending axially and radially at an oblique angle into the hydraulic turbocharger relative to the longitudinal axis, and the second sensor is configured to measure the change in the position of the shaft of the hydraulic turbocharger in an axial direction relative to the longitudinal axis, wherein the first sensor and the second sensor are configured to be exposed to a process fluid handled by the hydraulic turbocharger; and providing a notification when the operational parameter is abnormal.

13. The method of claim 12, comprising comparing the operational parameter to a range, and providing the notification when the operational parameter falls outside the range.

14. The method of claim 12, comprising comparing the operational parameter to a threshold, and providing the notification when the operational parameter fails to meet the threshold.

* * * * *